(12) United States Patent
Richter et al.

(10) Patent No.: US 9,405,737 B2
(45) Date of Patent: *Aug. 2, 2016

(54) SOCIAL DATA OVERLAY

(71) Applicant: Facebook, Inc., Menlo Park, CA (US)

(72) Inventors: Michael Judd Richter, Atherton, CA (US); Matthew William Kelly, Palo Alto, CA (US); Austin Haugen, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/327,378

(22) Filed: Jul. 9, 2014

(65) Prior Publication Data

US 2014/0325341 A1    Oct. 30, 2014

Related U.S. Application Data

(63) Continuation of application No. 13/116,923, filed on May 26, 2011, now Pat. No. 8,843,554.

(51) Int. Cl.
*G06F 15/16* (2006.01)
*G06F 17/22* (2006.01)
*G06Q 50/00* (2012.01)
*H04L 29/06* (2006.01)
*G06F 17/00* (2006.01)

(52) U.S. Cl.
CPC ............ *G06F 17/2247* (2013.01); *G06Q 50/01* (2013.01); *H04L 65/403* (2013.01)

(58) Field of Classification Search
CPC ... G06F 17/2247; G06Q 50/01; H04L 65/403
See application file for complete search history.

(56) References Cited

U.S. PATENT DOCUMENTS

| | | | | |
|---|---|---|---|---|
| 2007/0282950 A1* | 12/2007 | Fischer | .................. | G06Q 10/10 709/204 |
| 2008/0016164 A1* | 1/2008 | Chandra | ........... | G06F 17/30899 709/206 |
| 2009/0254843 A1* | 10/2009 | Van Wie | ............. | H04L 12/1822 715/757 |
| 2010/0023584 A1* | 1/2010 | Kamdar | .................. | G06Q 10/10 709/206 |
| 2011/0066636 A1* | 3/2011 | Guido | .................... | G06F 17/241 707/769 |
| 2011/0314386 A1* | 12/2011 | Jeong | .................... | G06F 3/0487 715/741 |
| 2012/0117471 A1* | 5/2012 | Amidon | .................... | H04N 5/76 715/716 |
| 2013/0013695 A1* | 1/2013 | Jin | .......................... | G06Q 10/10 709/204 |
| 2013/0262588 A1* | 10/2013 | Barak | ...................... | H04L 67/22 709/204 |

OTHER PUBLICATIONS

MX Office Action for Application No. MX/A/2013/014807, Feb. 18, 2015.

(Continued)

*Primary Examiner* — Andrew Lai
*Assistant Examiner* — M Mostazir Rahman
(74) *Attorney, Agent, or Firm* — Baker Botts L.L.P.

(57) ABSTRACT

In particular embodiments, a method comprising, by one or more computing devices, identifying, at a client device, one or more objects or references to the one or more objects embedded in a structured document displayed to a first user, accessing a social graph to determine if one or more second users having an association with the first user have accessed any of the one or more identified objects, and modifying, for at least one of the one or more identified objects, the structured document displayed to the first user to indicate that the at least one or more identified objects has been accessed by one or more second users.

20 Claims, 5 Drawing Sheets

(56) References Cited

OTHER PUBLICATIONS

AU Patent Examination Report for Application No. 2012-258908, May 20, 2015.

* cited by examiner

SOCIAL DATA OVERLAY

PRIORITY

This application is a continuation under 35 U.S.C. §120 of U.S. patent application Ser. No. 13/116,923, filed 26 May 2011.

TECHNICAL FIELD

The present disclosure generally relates to social networking systems, and more specifically relates to accessing social networking systems to enhance browsing activities in connection with third party websites.

BACKGROUND

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. A social networking system, such as a social networking website, enables its users to interact with it and with each other through the system.

The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. The social networking system may also create and store user preferences.

A social networking system may support application programming interfaces and associated functionality that allows third-party systems to access user profile data of its users. Such third party websites can use the user profile data can use the identity and account of a user for purposes of identifying users and maintaining their accounts at such third party websites. These third party websites may also access user profile data in order to personalize or customize the user experience on the site.

SUMMARY OF PARTICULAR EMBODIMENTS

The present disclosure generally relates to social networking systems, and more specifically relates to accessing social networking systems through third party websites.

In particular embodiments, a method comprising, by one or more computing devices, identifying, at a client device, one or more objects or references to the one or more objects embedded in a structured document displayed to a first user, accessing a social graph to determine if one or more second users having an association with the first user have accessed any of the one or more identified objects, and modifying, for at least one of the one or more identified objects, the structured document displayed to the first user to indicate that the at least one or more identified objects has been accessed by one or more second users.

These and other features, aspects, and advantages of the disclosure are described in more detail below in the detailed description and in conjunction with the following figures.

DESCRIPTION OF EXAMPLE EMBODIMENTS

Figure 1:
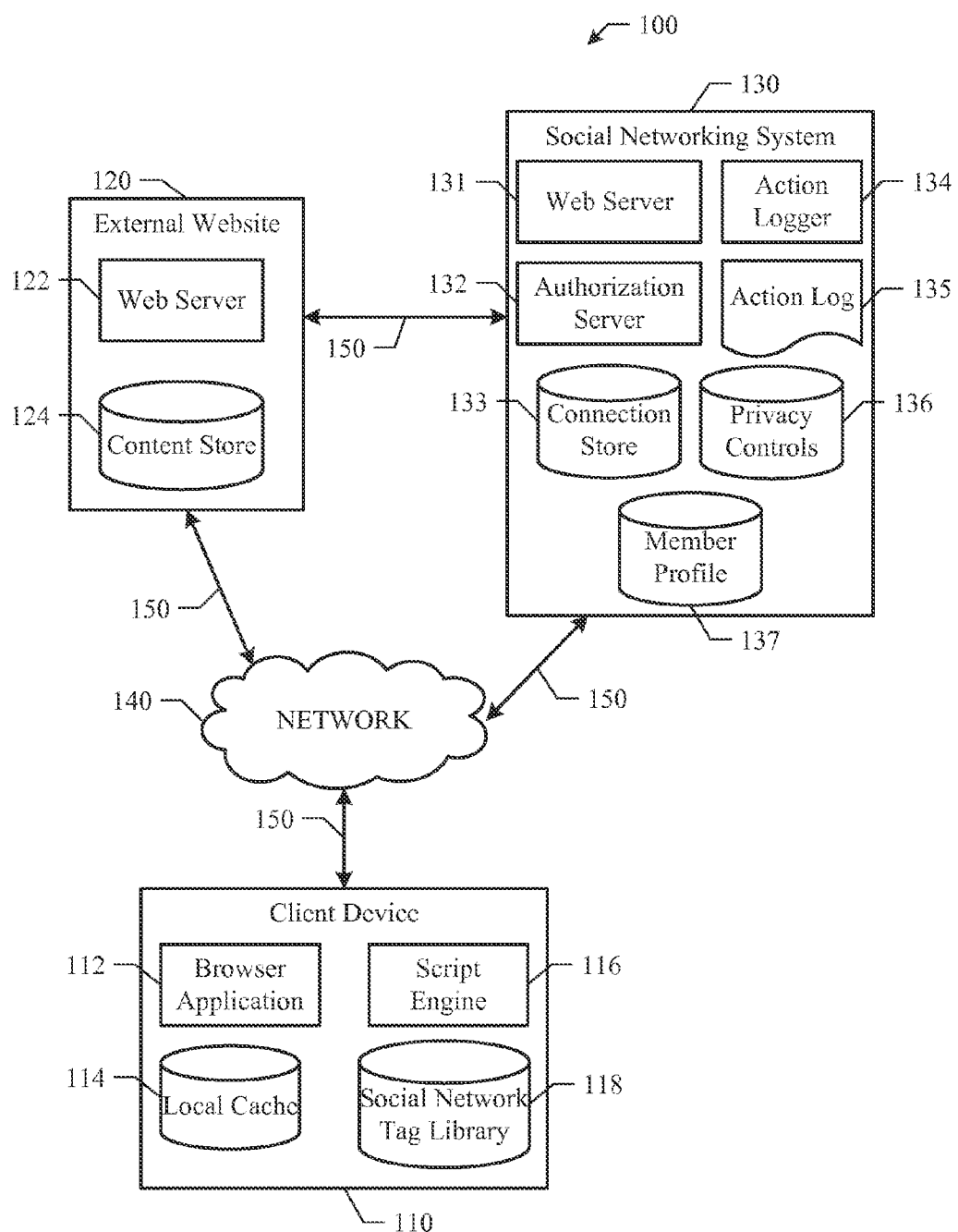
FIG. 1 illustrates an example system.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Social Network Systems and Accessible User Profile Data

A social networking system, such as a social networking website, enables its users to interact with it, and with each other, through the system. Typically, to become a registered user of a social networking system, an entity, either human or non-human, registers for an account with the social networking system. Thereafter, the registered user may login to the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile," in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

In particular embodiments, an edge may be one of a plurality of edge types based at least in part on the types of nodes that the edge connects in the social graph. In particular embodiments, for example, each edge from a first edge type defines a connection between a pair of user nodes from the first set, while each edge from a second edge type defines a connection between a user node from the first set and a concept node from the second set. Furthermore, each edge from a third edge type may define a connection between a pair of concept nodes from the second set. In particular embodiments, the edge itself may store, or be stored with, data that defines a type of connection between the pair of nodes the edge connects. In particular embodiments, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other particular embodiments, data that may indicate the type of connection or relationship between nodes connected by an edge may be stored with the nodes themselves. Additional information on automatic edge generation in an integrated social graph is described in U.S. patent application Ser. No. 12/763,145, which is incorporated by reference herein for all purposes.

Similar to user profile pages, concept profile pages ("hubs") share information related to the concept associated with the corresponding hub node. In particular embodiments, any registered user logged in to social networking system and viewing a hub may add content to the hub similar to a wikisite. A hub may also generally include a basic information section, a detailed info section, as well as, potentially, other sections, any and all of which may generally be filled in by any user viewing the hub. In particular embodiments, wall (or news feed/activities feed) section, or other feed or activities section of the hub, displays comments, status updates, wall posts and other user activities associated with the user and friends of the user that are viewing the hub. The wall (or news feed/activities feed) section, or other feed or activities section of the hub may also display comments, status updates, wall posts and other user activities and user generated content that are related to the concept for which the hub was created. A hub may also include a photo or picture section under photos tab allowing users to upload images in or related to the concept, one of which may be selected as a profile picture for the hub.

In particular embodiments, user nodes and hub nodes stored in the social graph database may be connected with one another via edges. In particular embodiments, each edge may be classified or characterized by an edge type of a plurality of edge types that define, indicate, or characterize the connection between the pair of nodes connected by the edge. In particular embodiments, edges define friendship or other social relationship connections between users (e.g., friends) associated with the respective user nodes.

A social networking system may support a variety of applications, such as photo sharing, on-line calendars, search, events, and location-based services. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

FIG. 1 illustrates a particular embodiment of a system that includes a client device 110, an external website 120, and a social networking system 130. In particular embodiments, links 150 illustrate interactions between client device 110 and external website 120, between client device 110 and social networking system 130, and between external website 120 and social networking system 130.

Client device 110 is generally a computer or computing device including functionality for communicating over a computer network(e.g., remotely). Client device 110 may be a desktop computer, laptop computer, personal digital assistant (PDA), in- or out-of-car navigation system, smart phone or other cellular or mobile phone, or mobile gaming device, among other suitable mobile computing devices. Client device 110 may execute one or more client applications, such as a web browser (e.g., Microsoft Windows Internet Explorer, Mozilla Firefox, Apple Safari, Google Chrome, and Opera, etc.), to access and view content over a computer network.

In particular embodiments, client device 110 may host a browser application 112 or other application that processes structured documents. In particular embodiments, client device 110 may have received one or more structured documents from external website 120 and/or social networking system 130. In particular embodiments, the structured document may be a markup language document that contains text, links, scripts, and other attributes, such as API calls identifying social network data elements of a user profile maintained by social networking system 130. In particular embodiments, the structured document may contain instructions, for example, to specify how to render content for display at client device 110. In particular embodiments, the structured document may contain instructions, for example, on how to access additional information from social networking system 130. Alternatively, the instructions within structured document may contain program logic interpreted by a scripting engine 116 on the client device 110.

In particular embodiments, browser application 112 may process the markup language in the structured document and render the structured document as a displayable web page. In particular embodiments, the displayable web page may include content of the external website 120 as well as one or more of the located social network data elements of the social networking system 130. In particular embodiments, browser application 112 may display the rendered web page on a display of client device 110. For example, a structured document hosted by external website 120 may contain an API call for a profile picture of a user. The browser application 112, when processing the structured document, may transmit a request to social networking system 130 to retrieve the user's profile picture. The request may be an HTTP request and may further include a browser cookie with information identifying the user of social networking system 130. The browser cookie may include state and other information indicating the status of the user, for example, whether the user has recently logged in and/or authenticated to the social networking system 130. Still further, the structured document provided by external website 120 may include a segment (such as a div or iframe) that prompts the user to log in to social network system 130. For example, the structured document may include HTML code, Javascript and other controls that cause the browser hosted by client device 110 to access social networking system 130 and render a login interface in a section of the displayed structured document.

In particular embodiments, external website 120 may be any website accessible on the Internet, and may have various formats, such as, for example and without limitation, text, audio, video, images, web pages, documents, executables, etc. Examples of external website 120 that provides audio content includes, but is not limited to, Pandora (http://www.pandora.com), or Rhapsody (http://www.rhapsody.com), etc. Examples of external website 120 that provide video or other content include, but are not limited to, Hulu (http://www.hulu.com), YouTube (http://www.youtube.com), or The New York Times (http://www.nytimes.com), etc. In particular embodiments, external website 120 and its contents may be stored at many different sites, such as on computers and servers, in databases, etc., around the world. These different sites are communicatively linked to the Internet through various network infrastructures and the Uniform Resource Locator (URL) of external website 120 specifies where the corresponding document is located and the mechanism for retrieving it. Any person may access the publicly available external website 120 or its contents via a suitable network device (e.g., a computer, a smart mobile telephone, etc.) connected to the Internet.

In particular embodiments external website 120 and social networking system 130 may have one or more users or members. In particular embodiments, users of external website 120 may also be users of social networking system 130. In particular embodiments, a user may interact with external website 120 and/or the social networking system 130 using client device 110. In particular embodiments, the social networking system 130 may keep user profile information and the connections among the users.

In particular embodiments, the social networking system 130 may receive requests from either the external website 120 or the client device 110 to which the social networking system 130 may respond with the requested information or with a subset of the requested information. Particular interactions between client device 110, the external website 120, and the social networking system 130 and information exchanged between the three systems will be described later in detail. As discussed in more detail below, implementations of the invention include augmented client-side functionality directed to informing the user as to which social network data elements of the user the external website 120 desires access and allows the user to control such access consistent with his or her privacy configurations.

In particular embodiments, social networking system 130 may include a web server 131, an authorization server 132, an action logger 134, an action log 135, a connection database 133, a privacy controls database 136, and member profile database 137. In particular embodiments, social networking system 130 may include additional, fewer, or different modules for various applications. Conventional components such as network interfaces, security mechanisms, load balancers, failover servers, management and network operations consoles, and the like are not shown so as to not obscure the details of the system. In particular embodiments, the social networking system 130 comprises a computing system that allows users to communicate or otherwise interact with each other and access content as described herein.

In particular embodiments, the social networking system 130 stores user profile data and social graph information in member profile database 137. In particular embodiments, the social networking system 130 stores data describing one or more connections between different users in the connection database 133. Particular embodiments of the connection database 133 may store connection information for users who have indicated similar or common work experience, group memberships, hobbies, or educational history. In particular embodiments, the social networking system 130 may also include user-defined connections between different users and those connections may be stored in connection database 133 as well. Particular embodiments of connection database 135 may allow users to specify their relationships with other users. In particular embodiments, for example, these user defined connections allows users to generate relationships with other users that parallel the users' real-life relationships, such as friends, relatives, co-workers, partners, and so forth. In particular embodiments, users may select from predefined types of connections, or define their own connection types, as needed.

In particular embodiments, the web server 131 links the social networking system 130 via the network 140 to one or more client devices 110. Network 140 generally represents a network or collection of networks (such as the Internet or a corporate intranet, or a combination of both) over which client devices 110 may access the external website 120 and the social network system 130. In particular embodiments, the web server 131 serves web pages, as well as other web-related content, such as Java, Flash, XML, and so forth. Particular embodiments of the web server 131 may include a mail server or other messaging functionality for receiving and routing messages between the social networking system 131 and the client devices 110. In particular embodiments, the messages may be instant messages, queued messages (e.g., email), text and SMS messages, or any other suitable messaging technique.

In particular embodiments, the action logger 134 is capable of receiving communications from the web server 131 about user actions on and/or off the social networking system 130. In particular embodiments, the action logger 134 populates the action log 135 with information about user actions in order to track them. More specifically, any action that a particular user takes with respect to another user is associated with each user's profile through information maintained in a database or other data repository, such as the action log 135. In particular embodiments, the actions taken by the members that are recorded in the action log 135 may be actions taken by the members on the social networking system 130 or actions taken by the members on the external website 120. In particular embodiments, the actions taken by the members on an external website 120 are communicated to the web server 131 and the web server 131 sends a request to the action logger 134 to record the actions in the action log 135. In particular embodiments, such actions may include, for example, adding a connection to the other user, sending a message to the other user, reading a message from the other user, viewing content associated with the other user, attending an event posted by another user, among others. Additionally, in particular embodiments, actions in connection with other objects may be directed at particular users, and these actions may be associated with those users as well.

In particular embodiments, when a user takes an action on the social networking system 130, the action is recorded in an action log 135. In particular embodiments, the social networking system 130 maintains the action log 135 as a database of entries. In particular embodiments, when an action is taken on the social networking system 130, the social networking system 130 adds an entry for that action to the action log 135.

In particular embodiments, a user of the social networking system may share media hosted by external websites with the social networking system and this action may be received by action logger 134 and stored in action log 135. In particular embodiments, external websites may have "share" buttons that are operative to transmit links to the content to the social networking system and post the links as wall post entries for a user profile. In particular embodiments, the buttons are operative to transmit activity stream entries to the social networking system, which will post the entry in a news feed. In particular embodiments, for example, a user can access a photo, a photo album, a video clip, or other media from a client device 110 and post links to that content on the wall associated with a user profile on social networking system.

In particular embodiments, privacy controls database 136 may store a user's privacy data for a user's settings for each user datum associated with the user and the user's settings for third party applications. For example, a user may have selected default privacy settings or a user may have specifically excluded certain entities from viewing a user datum or particular type of user data, and all of that privacy data for all users and friends of users may be stored in the privacy controls database 136.

In particular embodiments, a user's privacy data may comprise privacy settings associated with any aspect of the user profile, including changes that the user makes to the user profile, events, locations, media, activities, connections between one or more users, the news feed associated with the user or any other action that the user takes in the social networking system. In particular embodiments, the privacy settings associated with the privacy controls database 136 may be provided and stored at different levels of granularity. In particular embodiments, for example, the information to be shared may be specific information, such as, work phone number, or a set of related information, such as, personal information including several pieces of related information including profile photo, home phone number, and status. Alternatively, in particular embodiments, the privacy settings associated with the privacy controls database 136 may apply to all the information associated with the user in the social networking system.

In particular embodiments, the specification of the set of entities that may access particular user information may also be specified at various levels of granularity. In particular embodiments, the user may specify any number of entities with which information may be shared. In particular embodiments, sets of entities with which information may be shared may include, for example, specified friends of the user, all friends of the user, all friends of friends, all applications, and all external systems. In particular embodiments, for example, the user may provide a list of external systems that may access certain information as well.

Particular embodiments may specify a set of entities that includes exceptions that are not allowed to access the user's information. In particular embodiments, for example, the user of the social networking system may allow all external systems to access the user's work information but specify a list of external systems that are not allowed to access the work information. In particular embodiments, the list of exceptions that are not allowed to access certain information of the user may be a "block list." In particular embodiments, external systems belonging to a block list specified by a user of the social networking system are blocked from accessing the information specified in the privacy setting stored in privacy controls database 136. Particular embodiments contemplate various combinations of granularity of permitted access or denial of access depending on the type of user information and sets of entities with which information may be shared or accessed by the sets of entities, as specified by the user and stored in the privacy controls database 136.

In particular embodiments, the authorization server 132 enforces the privacy settings of the users of the social networking system, such as described above with respect to the privacy policy. In particular embodiments, the privacy setting of a user determines how particular information associated with a user may be shared. In particular embodiments, as described above, the privacy controls database 136 comprises the privacy data for a user's settings for each user datum associated with the user and the user's settings for third party applications. More specifically, the privacy data for a user's settings may specify particular information associated with a user and the entity or entities with whom the information may be shared. In particular embodiments, the entities with which information may be shared, may include users, third party applications, external websites, or any other entity that can potentially access the information. In particular embodiments, the information that may be shared by a user may comprise any aspect of the user profile, events, locations, media, activities, or the news feed associated with the user.

Figure 3A:
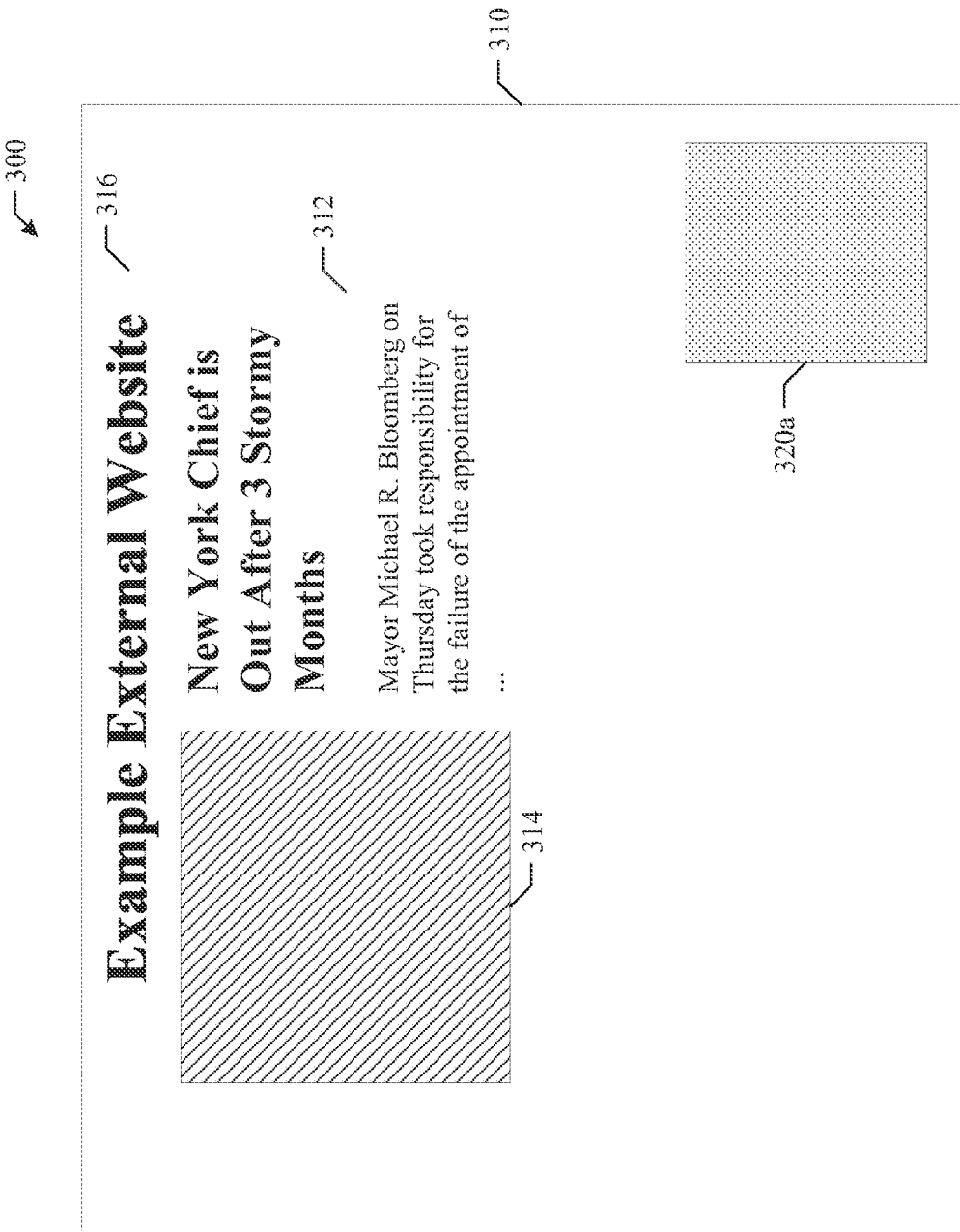
FIG. 3a illustrates an example displayed structured document.
Figure 3B:
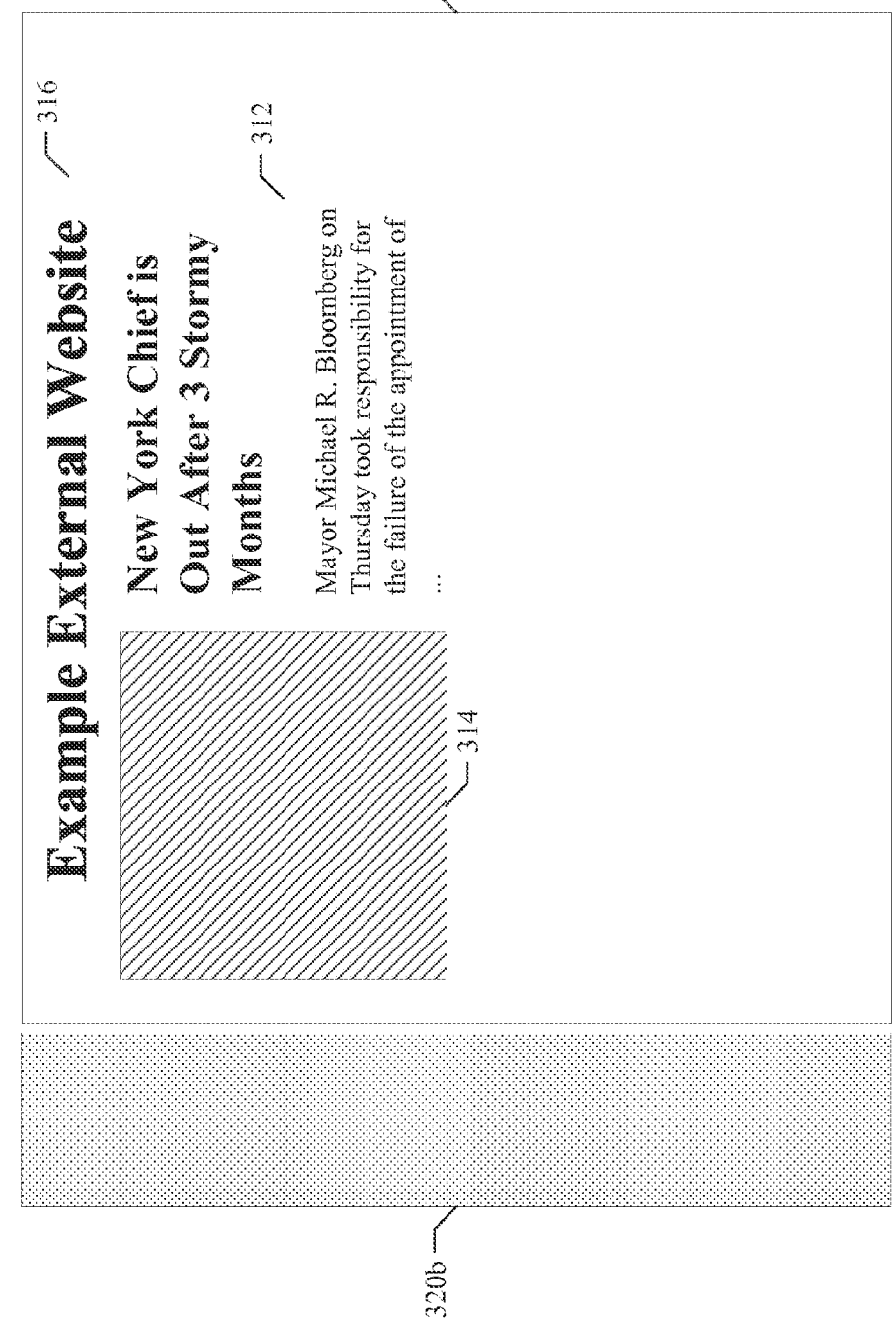
FIG. 3b illustrates a second example displayed structured document.

FIGS. 3a and 3b illustrate an example external website 300. In particular embodiments example external website 300 may comprise one or more structured documents 310, and within the structured document 310, there may be one or more objects 312, 314, 316. Typically, to render a webpage associated with a web application, the web application and/or web browser at a client device requires access to one or more resources provided at one or more backend servers of an associated website. A resource or webpage, which may itself include multiple embedded resources, may include data records, such as content plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java.

In particular embodiments, HTML may enable a page developer to create a structured document by denoting structural semantics for text and links, as well as images, web applications and other objects that can be embedded within the page. Generally, a web page may be delivered to a client as a static document, however, through the use of web elements embedded in the page, an interactive experience may be achieved with the page or a sequence of pages. The web browser obtains the required resources (e.g., in response to executing JavaScripts or other calls embedded in a requested and received structured document and which may include HTML or XML code and/or JavaScript scripts and/or content including text, audio, and video) for rendering the webpage from one or more servers and then constructs a browser representation of the webpage. In particular embodiments, the browser processes the structured document and creates an in-memory representation of the document. The representation may be a Document Object Model (DOM) representation of the webpage. The web browser then renders the page in the particular client viewing window of the browser utilizing the DOM (or other suitable) representation.

Typically, a web browser is used to access a webpage (or other structured document) for rendering at a client device. A web browser application is generally a computer program configured to run on a user's computing device (e.g., client device 110) that enables the user to connect to various server-hosted webpages available over a network. A non-exhaustive set of common web browsers include, by way of example, Internet Explorer™, Firefox™, Safari™, and Opera™. The web browser provides a standard viewing window that displays the informational and visual content of the webpage or website (the term "website" and "webpage" may be used interchangeably herein where appropriate). The URL of the website presently being rendered and viewed is displayed in the address box of the web browser GUI. The address box enables a user to input an address (e.g., a URL) for a desired (target) webpage. The content of the website generally includes graphical images, text, and/or hyperlinks (e.g., comprising code segments that redirect the web browser and user to another portion of the webpage or to a subsequent webpage altogether without requiring manual input of the subsequent webpage's address). In various example embodiments, the webpage can also include audio, video, and other types of web content. To facilitate navigation of the rendered page, the web browser GUI may include scrolling bars or buttons. By clicking and/or dragging these bars or buttons, a user may selectively view other portions of the webpage, which do not entirely fit the immediately viewable areas of the GUI rendered by the web browser.

Particular embodiments relate to a plug-in software application (hereinafter referred to as "social enhancement application") that operates or executes in the context of a browser (e.g., a web browser) or other application client that consumes structured documents. In other implementations, the functionality described herein can be incorporated directly into a browser client application, as opposed to being a plug-in.

Social Network Overlay on an External Website

Figure 2:
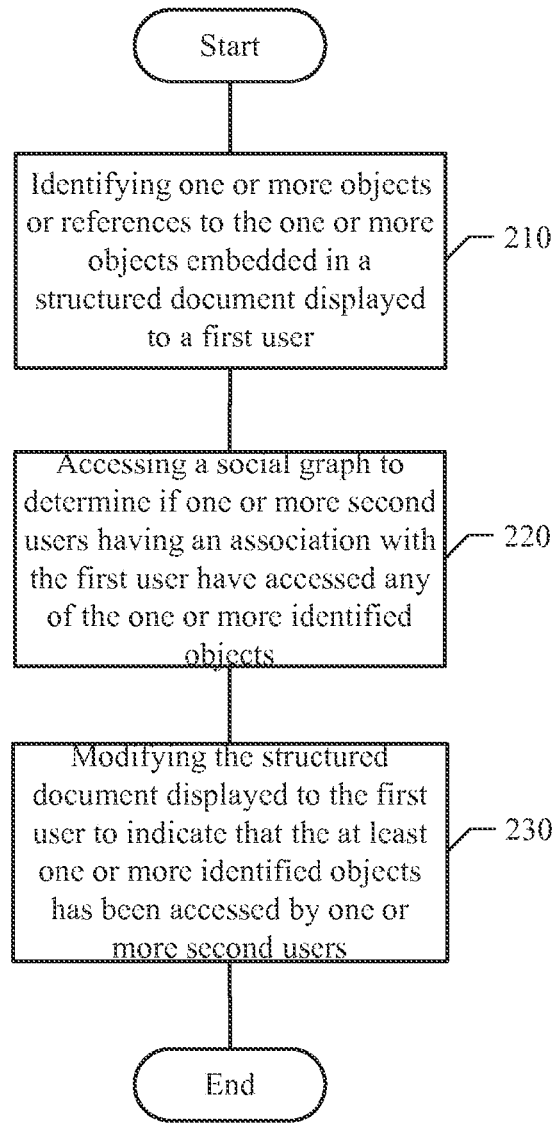
FIG. 2 is a flow chart diagram that illustrates a method.

FIG. 2 illustrates an example method of modifying a structured document to display social network data for other users who have accessed and interacted with the displayed structured document. In particular embodiments, the browser or plug-in records all click-stream activity for all users that have interacted with objects and references of the displayed structured document and transmits data representing the click-stream activity to the social networking system. In particular embodiments, the browser or plug-in then queries the social networking system based on the references and objects identified in the page, and modifies the page to indicate which friends have viewed or accessed the object. In particular embodiments, modifications may be, but not by way of limitation, displaying profile pictures of second users that have interacted with the object when the first user mouses-over a link to the object, and changing the color, font-type, size, or style of the displayed object, and so forth.

Particular embodiments identify, at a client device, one or more objects or references to the one or more objects embedded in a structured document displayed to a first user, as illustrated in step 210. As described above, when a structured document is requested having HTML or other markup language content, such as objects or references within a structured document, it is received by the web browser in order to process the page so that the web browser may render and display the webpage. Typically, the application and/or web browser at a client device requires access to one or more objects or resources provided at one or more backend servers of the website. In particular embodiments, the objects or references that are displayed to the first user are identified.

Particular embodiments access a social graph to determine if one or more second users having an association with the first user have accessed any of the one or more identified objects, as illustrated in step 220. As described above, social graph information is maintained by a social networking system. In particular embodiments, associations between the first user and any one or more second users may be represented by one or more edges and nodes within the social graph, as described above. In particular embodiments, a first user may have an association with a second user if an edge exists between them in the social graph. In particular embodiments, if any one or more of the associated second users have accessed any of the one or more identified objects, there will also be edges between the second users and those objects.

Particular embodiments generate data indicating an edge relationship from the first object and the user responsive to any detected user interaction by a user with any object of the structured document. In particular embodiments, objects may have an edge type, as described above. In particular embodiments, the data stored in the social graph may be a list of URLs that a user has accessed. In particular embodiments, interactions may be past or current user interactions with objects or references in the displayed structured document.

Particular embodiments transmit the recorded data from all users to the social networking system where the data is stored within the social graph. In particular embodiments, the browser or plug-in records all click-stream activity for all users that have interacted with objects and references of the displayed structured document and transmits data representing the click-stream activity to the social networking system where it is stored within the social graph. In particular embodiments, the data structure in the back end would store an index of URL or object identifiers and UserIDs.

In particular embodiments, the browser or plug-in queries the social networking system and accesses the social graph data to determine if any second users having an association with the first user in the social graph have interacted with objects or references of the displayed structured document. In particular embodiments, the browser or plug-in would query URLs or other object or references in the structured document that have been accessed, look up the user IDs for the second users that have accessed the URLs or other objects or references in the structured document, and then use the first user's user ID to compare to the set of second users that have accessed URLs or other objects or references in the structured document. In particular embodiments, if there are no second users having an association with the first user in the social graph that have interacted with objects or references of the displayed structured document, then a set of aggregate interaction statistics for all other users may be displayed.

In particular embodiments, for example, if any one of the one or more second users have read an article on http://www.nytimes.com, there will be a read edge between the second user and the article that is transmitted to the social network system and stored within the social graph. In particular embodiments, when the browser queries the social networking system for second users having an association with the first user, it may use the URL of the article as well as the UserID of the second users when comparing to the UserID of the first user. In particular embodiments, the second user may be any one of the first user's first (and possibly second degree) contacts or associations. Still further, for example, if any one of the one or more second users have read and "liked" the article, there will be both a read and a "like" edge associated with the second user and that article. In particular embodiments, if no users have a first, second degree, or any association with the first user, then the aggregate statistics may be that "1,200 people have watched this," and these aggregate statistics may be displayed in association with the article.

In particular embodiments, accessing the social graph to determine if one or more second users having an association with the first user have accessed any of the one or more identified objects may be conditioned on a set of user preferences of the first user of the social networking system. In particular embodiments, the user preferences that allow the browser or application to access the social graph may be associated with the privacy settings and other information stored in privacy controls database 136. In particular embodiments, one or more aspects of the user's privacy settings may be stored locally (and/or synchronized with privacy controls database 136) at the browser application in the client device to obviate the need for remote access.

In particular embodiments, as described above with respect to privacy controls database 136, a user may store privacy settings and may specify particular entities, third party applications, or website domains that may or may not be allowed to access the user's information in the social networking system. In particular embodiments, the user's privacy settings may grant full access to all third party entities, third party applications, or website domains. In particular embodiments, the user's privacy settings may restrict specific entities, third party application, or website domains. In particular embodiments, the user's privacy settings may limit or grant access to particular types of social network data. In particular embodiments, the user's privacy settings may grant access to the user's social network data, but in such a way that the user remains anonymous.

In particular embodiments, where the user has no set of preferences for granting permission to access the social graph, the user may be prompted to login to the social networking system. In particular embodiments, where the user logs into the social networking system, the social graph data will then be exchanged between social networking system 130 and external website 120.

Particular embodiments modify, for at least one of the one or more identified objects, the structured document displayed to the first user to indicate that the at least one or more identified objects has been accessed by one or more second users, as illustrated in step 220. In particular embodiments, the browser modifies the page to indicate which friends have viewed or accessed the object based on the references and objects identified in the page. In particular embodiments, modifications may be, but not by way of limitation, displaying profile pictures of second users that have interacted with the object when the first user mouses-over a link to the object, and changing the color, font-type, size, or style of the displayed object, and so forth.

In particular embodiments, in order to modify the structured document, the application accesses the DOM (or other suitable) representation of the currently rendered structured document generated by the web browser. In particular embodiments, the application may modify, or cause to be modified the DOM representation of the target webpage (without necessarily modifying the native HTML or other markup language cone or content transmitted to the browser for rendering the target webpage (which is generally stored separately)) to indicate that the objects within the structured document have been accessed by one or more second users. In particular embodiments, the modified DOM representation may display objects on the structured document as highlighted, colored, bolded, or any other such modification that would indicate that objects have been accessed by one ore more second users. In particular embodiments, the modified DOM representation may display an overlay panel or a sidebar that indicates that at least one or more identified objects have been accessed by one or more second users.

In particular embodiments, as illustrated in FIGS. 3a and 3b, the display on the example external website 300 may be modified to display a structured document that indicates that at one or more identified objects has been accessed by one or more second users. In particular embodiments, objects 312, 314, 316 may be highlighted, colored, bolded, or any other such modification that would indicate that objects 312, 314, 316 have been accessed by one ore more second users. In particular embodiments, objects 312, 314, 316 may have small icons displayed near them that indicate that the objects have been accessed by one or more second users. In particular embodiments, the display on the external website itself may be modified. In particular embodiments, the modification may not be revealed until the first user mouses-over objects 312, 314, 316.

In particular embodiments, the structured document displayed to the first user to indicate that the at least one or more identified objects has been accessed by the one or more second users may display social network data elements of the one or more second users proximal to the one or more identified objects. In particular embodiments, as illustrated in FIGS. 3a and 3b, social network data of the one or more second users may be displayed proximal the one or more identified objects of the displayed structured document, such as panel 320a, 320b. Particular embodiments illustrate that panel 320a is an overlay of the structured document 310, whereas panel 320b is proximal to structured document 310. Particular embodiments, in any case, demonstrate that panel 320a and 320b are proximal to the one or more identified objects.

In particular embodiments, panel 320a and 320b may display any social network data elements of the user profile of each one or more second users. As described above, various information is provided by the user when registering with the social networking system. In particular embodiments, any profile information associated with each one or more second users may be displayed in panel 320a and 320b, such as the second user's profile picture, contact information, birth date, gender, marital status, family status, employment, educational background, preferences, interests, and other demographical information, including social graph data that the second user has generated as a result of accessing or interacting with objects or references of the structured document of the external website 300. In particular embodiments, for example, if a second user associated with the first user had read and "liked" an article at http://www.nytimes.com, then data indicating that an edge exists between the second user and that article would be displayed in panel 320a and 320b. Additionally, in particular embodiments, for example, panel 320a and 320b may display the second user's profile picture and other profile information as well.

Figure 4:
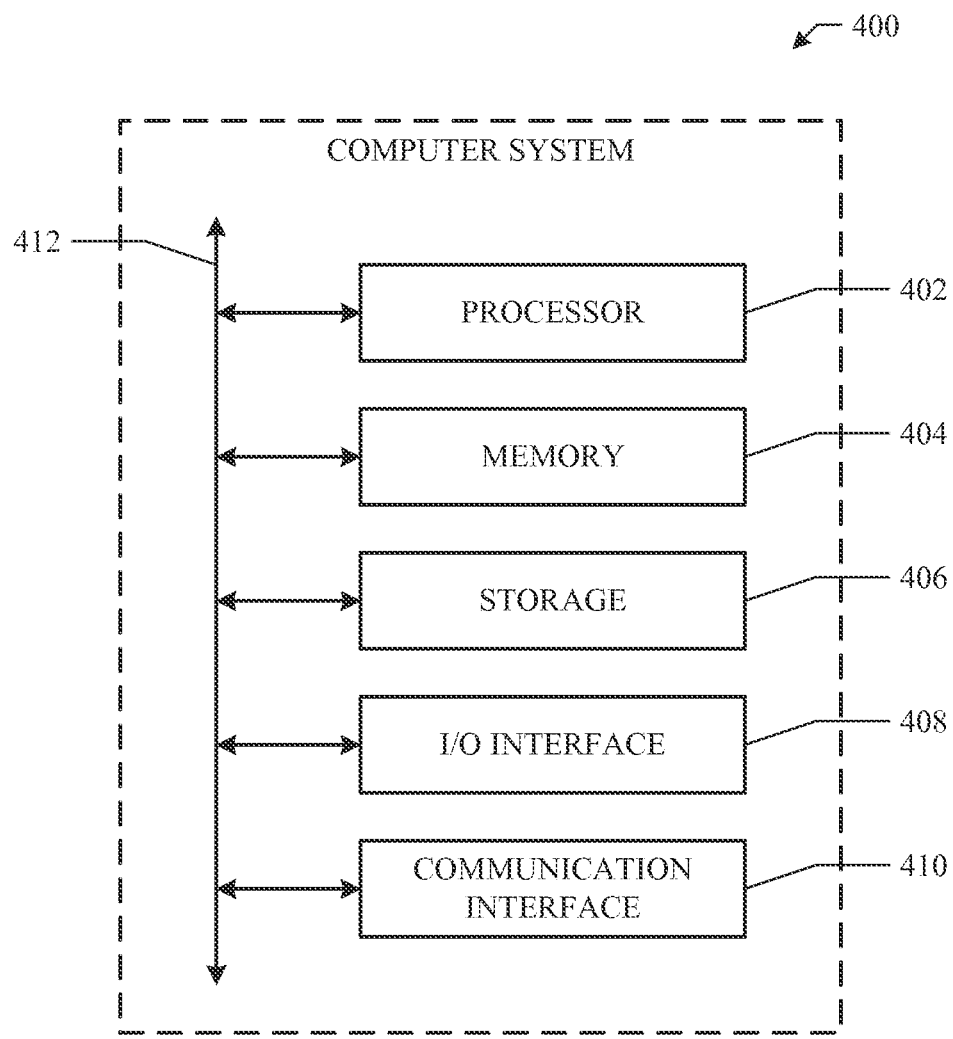
FIG. 4 illustrates an example computer system.

Particular embodiments may be implemented on one or more computer systems. FIG. 4 illustrates an example computer system 400 that may be used to implement a server. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate. The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:
1. A method comprising:
  by a server, receiving an identification of one or more objects or references to the objects embedded in a structured document displayed on a client computing device to a first user, wherein:

the structured document is a markup-language document displayed as a webpage; and the objects originate from one or more sources external to a social-networking system;

by the server, accessing a social graph of the social-networking system to:

determine if one or more second users having an association with the first user have accessed or are accessing any of the identified objects; and retrieve, from the social-networking system, one or more social-network data elements comprising social-network profile information provided by one or more of the second users to the social-networking system; and by the server, sending to the client computing device one or more instructions to modify, for at least one of the objects, the structured document displayed as a webpage to the first user to indicate that the object embedded in the structured document and originating from the sources external to the social-networking system has been accessed or is being accessed by one or more of the second users, wherein modifying the structured document comprises displaying, proximal to the object, one or more of the social-network data elements.

2. The method of claim 1, wherein accessing the social graph to determine if the second users have accessed or are accessing any of the identified objects is conditioned on a set of user preferences of the first user of the social-networking system.

3. The method of claim 1, wherein modifying the structured document comprises one or more of highlighting, coloring, or bolding one or more of the objects.

4. The method of claim 1, further comprising:

responsive to one or more detected interactions by the first user with one or more of the objects or references in the structured document, receiving data indicating one or more edge relationships from the objects or references to the first user; and sending the data indicating the edge relationships to the social-networking system.

5. The method of claim 1, wherein one or more of the social-network data elements displayed proximal to the object comprise data indicating an edge relationship from one or more of the identified objects to one or more of the second users.

6. The method of claim 1, wherein modifying the structured document comprises modifying, by a web browser executing on the client device, a representation of the structured document.

7. The method of claim 1, further comprising:

by the server, accessing the social graph of the social-networking system to retrieve, from the social-networking system, one or more sets of aggregate interaction statistics; and by the server, sending to the client computing device one or more instructions to display, proximal to the object, one or more of the sets of aggregate interaction statistics.

8. A system comprising:

one or more processors; and a memory coupled to the processors comprising instructions executable by the processors, the processors being operable when executing the instructions to:

by a server, receiving an identification of one or more objects or references to the objects embedded in a structured document displayed on a client device to a first user, wherein:

the structured document is a markup-language document displayed as a webpage; and the objects originate from one or more sources external to a social-networking system;

by the server, access a social graph of the social-networking system to:

determine if one or more second users having an association with the first user have accessed or are accessing any of the identified objects; and retrieve, from the social-networking system, one or more social-network data elements comprising social-network profile information provided by one or more of the second users to the social-networking system; and by the server, send to the client device one or more instructions to modify, for at least one of the objects, the structured document displayed as a webpage to the first user to indicate that the object embedded in the structured document and originating from the sources external to the social-networking system has been accessed or is being accessed by one or more of the second users, wherein modifying the structured document comprises displaying, proximal to the object, one or more of the social-network data elements.

9. The system of claim 8, wherein accessing the social graph to determine if the second users have accessed or are accessing any of the identified objects is conditioned on a set of user preferences of the first user of the social-networking system.

10. The system of claim 8, wherein modifying the structured document comprises one or more of highlighting, coloring, or bolding one or more of the objects.

11. The system of claim 8, wherein the processors are further operable when executing the instructions to:

responsive to one or more detected interactions by the first user with one or more of the objects or references in the structured document, receive data indicating one or more edge relationships from the one or more objects or references to the first user; and send the data indicating the edge relationships to the social-networking system.

12. The system of claim 8, wherein one or more of the social-network data elements displayed proximal to the object comprise data indicating an edge relationship from one or more of the identified objects to one or more of the second users.

13. The system of claim 8, wherein modifying the structured document comprises modifying, by a web browser executing on the client device, a representation of the structured document.

14. The system of claim 8, wherein the processors are further operable when executing the instructions to:

access the social graph of the social-networking system to retrieve, from the social-networking system, one or more sets of aggregate interaction statistics; and send to the client device one or more instructions to display, proximal to the object, one or more of the sets of aggregate interaction statistics.

15. One or more computer-readable non-transitory storage media embodying software that is operable when executed to:

by a server, receive an identification of one or more objects or references to the one or more objects embedded in a structured document displayed on a client device to a first user, wherein:

the structured document is a markup-language document displayed as a webpage; and the objects originate from one or more sources external to a social-networking system;

by the server, access a social graph of the social-networking system to:

determine if one or more second users having an association with the first user have accessed or are accessing any of the identified objects; and retrieve, from the social-networking system, one or more social-network data elements comprising social-network profile information provided by one or more of the second users to the social-networking system; and by the server, sending to the client device one or more instructions to modify, for at least one of the objects, the structured document displayed as a webpage to the first user to indicate that the object embedded in the structured document and originating from the sources external to the social-networking system has been accessed or is being accessed by one or more of the second users, wherein modifying the structured document comprises displaying, proximal to the object, one or more of the social-networking data elements.

16. The media of claim 15, wherein accessing the social graph to determine if the second users have accessed or are being accessed any of the identified objects is conditioned on a set of user preferences of the first user of the social-networking system.

17. The media of claim 15, wherein modifying the structured document comprises one or more of highlighting, coloring, or bolding one or more of the objects.

18. The media of claim 15, wherein the software is further operable when executed to:

responsive to one or more detected interactions by the first user with one or more of the objects or references in the structured document, receive data indicating one or more edge relationships from the objects or references to the first user; and send the data indicating the edge relationship to the social-networking system.

19. The media of claim 15, wherein one or more of the social-network data elements displayed proximal to the object comprise data indicating an edge relationship from one or more of the identified objects to one or more of the second users.

20. The media of claim 15, wherein the software is further operable when executed to:

access the social graph of the social-networking system to retrieve, from the social-networking system, one or more sets of aggregate interaction statistics; and send to the client device one or more instructions to display, proximal to the object, one or more of the sets of aggregate interaction statistics.

* * * * *